Aug. 2, 1955    E. G. READER ET AL    2,714,315
ROLLER MOUNTING FOR ROLLER GEAR DRIVES
Filed Oct. 14, 1954

Ernest Gordon Reader,
Karlis G. Ziemelis,
Stojan Karageorgieff,
Inventors.
Koenig and Pope
Attorneys.

2,714,315

ROLLER MOUNTING FOR ROLLER GEAR DRIVES

Ernest Gordon Reader, St. Louis County, Karlis G. Ziemelis, University City, and Stojan Karageogieff, St. Louis, Mo., assignors to Universal Match Corporation, Ferguson, Mo., a corporation of Delaware Application October 14, 1954, Serial No. 462,231

4 Claims. (Cl. 74—465)

This invention relates to roller gear drives and, with regard to certain more specific features, to roller mountings for such drives.

Among the several objects of the invention may be noted the provision of an improved roller mounting for roller gear drives in which a high degree of rigidity and accuracy with increased useful life at higher operating speeds are obtained at a manufacturing cost which is less than that of prior less rigid and less accurate mountings. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

Figure 1:
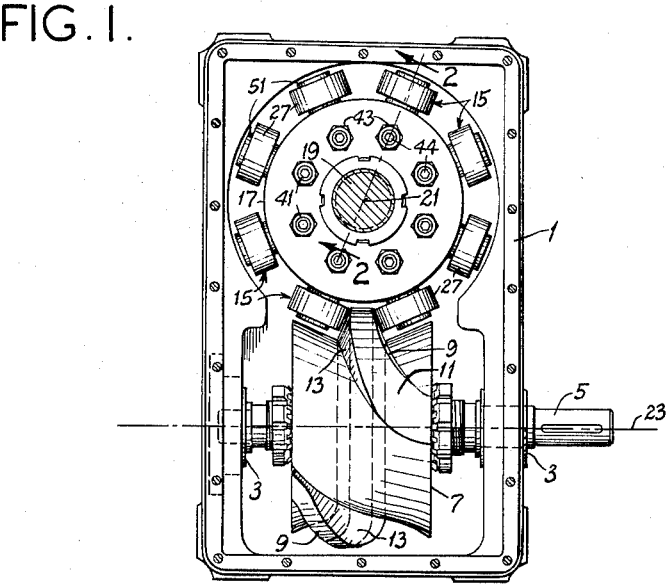
Figure 2:
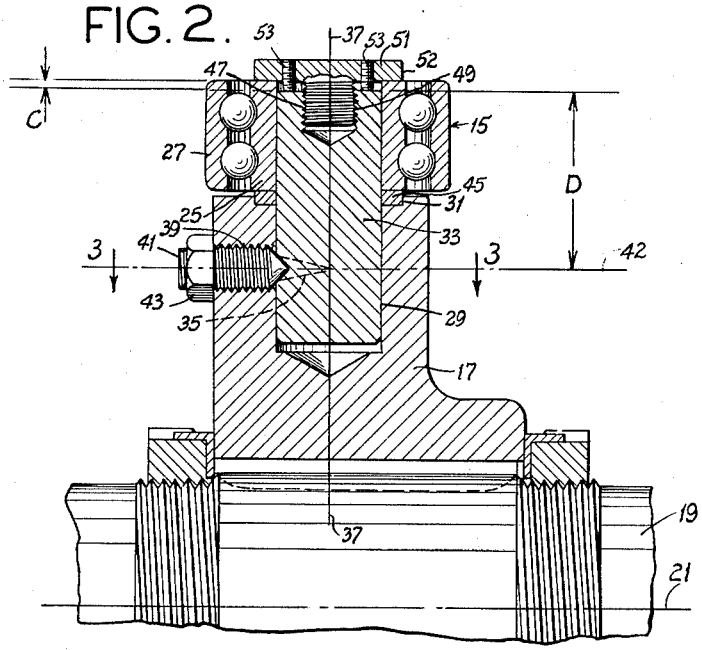
Figure 3:
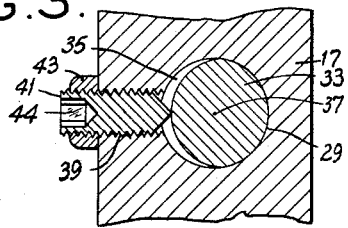

In the accompanying drawings, in which one of various possible embodiments of the invention is illustrated, Fig. 1 is a side elevation of a roller gear drive with its cover removed and embodying the invention, Fig. 2 is an enlarged radial section taken on line 2—2 of Fig. 1; and, Fig. 3 is a cross section taken on line 3—3 of Fig. 2.

Corresponding reference characters indicate corresponding parts throughout the several views of the drawings.

As illustrated in Fig. 1, a roller gear drive, of which the present invention forms a part, is constituted (for example) by a gear box 1 having bearings 3 for a drive shaft 5. Mounted and keyed to the drive shaft 5 is an hourglass cam 7, the surface of which has formed on it a helicoid 9 having a flat top 11 and angled sides 13. The sides 13 are engaged by the cylindric sides of rollers 15. The rollers 15 are radially mounted upon a hub 17, which is keyed to a driven shaft 19. The shaft 19 rotates upon an axis 21 located outside the plane of the axis 23 of shaft 5 and perpendicularly thereto. Upon continuous rotation of shaft 5, intermittent angular movements are obtained from driven shaft 19.

The drive is used for accurate indexing and like purposes. It will be understood that the particular helicoidal shape given to the helicoid 9 determines the intermittent angular displacement, velocity and acceleration of the driven shaft 19 for a given velocity of the drive shaft 5. In the example shown, the shaft 19 has a dwell for 180° of movement of shaft 5 and a 45° advance for the remaining 180° of movement of the drive shaft 5. The velocity and acceleration occurring during the advance are determined by the shape of the helicoid 9. Since the device is generally employed for precision indexing, it is made to a high degree of accuracy, both as to the form of the helicoid 9 and the positioning of the cylindric surfaces of the rollers 15 which engage its sides 13. We have found, particularly when rapidly indexing heavily loaded devices, that unless the rollers 15 are rigidly and accurately positioned, both radially and according to properly spaced angular intervals, the intended advantages of precision are lost and the life of the drive reduced. The invention relates particularly to such rigid and precise mounting of the rollers 15 on the hub 17.

Referring now more particularly to Fig. 2, it will be seen that each roller 15 is constituted by a double-row ball bearing having an inner race 25 and an outer race 27. The outer accurately ground cylindric surface of the latter serves to engage the sloping sides 13 of the helicoid 9. At numeral 29 is shown a radial bore in the hub 17. The accuracy of the depth of this bore is not critical, but its diameter is critical, and is therefore accurately machined by rough drilling and subsequent fine finishing by boring with a rotary fly cutter or the like. Suitable jigs are used for the purpose.

At the upper end of the bore 29 is a counterbore 31, accurately machined as to depth, so as accurately to distance its bottom from the center line 21. The tolerance in this respect is ±.005 inch maximum. The diameter of the counterbore 31 is not critical and the tolerance in this respect may therefore be on the order of ±1/64 inch.

At numeral 33 is shown a cylindric bearing stud in which is turned a 180° crescent-shaped peripheral groove 35 having an accurate 45° (for example) subtended angle throughout its length (measured in any axial plane), the depth of the section decreasing gradually toward its pointed ends. The stud is manufactured by initial rough cylindric machining and insertion of the groove 35, after which it is accurately cylindrically machined by centerless grinding. The tolerances maintained for the diameters of the bore 29 and of the stud 33 are such that an extremely light press fit is obtained between them, which is to say, a press fit requiring for assembly a force only slightly greater than a manual push, thereby obtaining extreme rigidity and accuracy of position of the radial center line 37. Center line 37 is therefore located accurately perpendicular to center line 21 and in a plane passing through the latter.

On one side of the bore 29 is a threaded opening 39 for a threaded set screw 41 having a hexagonal socket 44 for a suitable wrench, and adapted to be held in its ultimately set position by means of a jam nut 43. A fair, as distinguished from a high, degree of accuracy is required for the location and threading of the opening 39 and stud 33, for reasons which will appear. The inside end of the set screw is conical and has an apex angle of 45° (for example) substantially equal to that of the radial section of the groove 35. Thus, by backing off the set screw 41, the stud 33 may be conveniently press-fitted (as above described) so that the groove 35, axially considered, is approximately opposite the center line of the set screw and, angularly considered, approximately at the deepest peripheral portion of the groove. Then when the set screw is screwed home, the stud 33 is automatically set into a final position which is fairly accurate in respect to the distance D of its end from the center line 42 of the set screw. An advantage of the groove 35 (as against a mere set screw receiving hole) is that the angular positioning of the stud 33 around axis 37 needs only to be approximately correct (say within several degrees) without destroying the ability of the point of the set screw to effect proper final lengthwise positioning of the stud 33, as above described. In view of the above, it will be seen that the stud may be rapidly assembled with a great accuracy in those cases in which such accuracy is required.

After the stud 33 is assembled as stated, a spacer ring 45, which has a loose fit around the stud and a loose fit in the counterbore 31, is dropped over the stud. This ring 45 is accurately machined with a thickness which is slightly greater than the depth of the counterbore 31. This provides an accurately located upper surface for engagement by the inner end of the inner race 25. The fit between this inner race and the stud is of the normal light press variety for bearings, which requires somewhat greater force for assembly than that required for assembly of the stud 33 in the bore 29. The distance D established as above described between the central plane of the groove 35 and the upper end of the stud is such that a small clearance as shown at C is maintained between the upper end of the stud and the upper end of the inner race 25. It will be understood that the axial lengths of races of ball bearing assemblies such as constitute the rollers 15 are highly accurate. The clearance C is fairly, though not extremely accurately maintained, because of the fact already stated that only a fair degree of accuracy of the machining of the threads of opening 39 and set screw 41 is employed. The dimension of C is on the order of 1/64–1/32 inch. However, this distance C should be kept fairly small, so that the inner race 25 of the bearing constituting each roller 15 is rigidly supported throughout all but a very small portion of its length. Thus is assured a rigid and accurate positioning of the outer cylindric surface of the outer race 27.

At numeral 47 is a threaded opening in the upper end of the stud 33, for the reception of a threaded shank 49 of a flanged bearing cap 51. The flange is indexed 52. After the assembly process above described has been effected, the bearing cap 51 is threaded into the opening 47 until its flange engages the upper end of the inner race 25, the clearance C assuring such engagement with a sufficient negative tolerance to ensure that the cap may be drawn up tightly so as to hold the race 25 and ring 45 accurately and tightly in position on hub 17. Threaded openings in the flange of bearing cap 51 are adapted to receive cup-ended set screws 53 for locking the bearing cap in its final drawn-up position. This is effected by engagement of the cup ends of the set screws with the end of the stud 33. Only a fair degree of accuracy is required for the threading of the shank 49 and set screws 53.

In view of the above, the following advantages of the construction will be apparent:

(1) The position of center line 37 normal to center line 21 may be maintained with an accuracy and rigidity which was heretofore impossible to obtain or maintain with a screw connection between the stud and the hub.

(2) The radial positioning of the rollers 15 is accurately determined by the accuracy of depth of the counterbore 31 and thickness of the spacer ring 45.

(3) The positioning of the upper end of the bearing stud 33 is sufficiently accurately positioned with respect to the outer end of the rollers 15 to ensure a tight holding effect by the bearing cap 51 when screwed home, without excessively increasing the clearance C, thereby maximizing the extent of the inner support of the rollers 15 on the extension of the stud 33 from the hub.

(4) Criticalness of assembly operations, such as accurate determination of the depth of press fit of stud 33 and its angular position in the bore 29, is minimized. This is because on the one hand the subtending 45° angle of the groove 35 needs only roughly to span the inner point of the set screw 41 in order that the latter may complete the accurate vertical positioning of the stud. This completion of positioning is possible because of the light press fit between the stud and the opening 39. And on the other hand, the angular position of the stud 33 in the opening 39 is not critical because the point of the stud can effect its vertical final adjustment equally well when centrally positioned in the groove 35 and when positioned some distance off from center. It will be understood that the crescent-shaped groove does not rapidly change its depth for a number of degrees on both sides of its middle part.

(5) Assembly of each spacer ring 45 and roller 15 on stud 33 may be rapidly accomplished without close attention to the formation of proper clearance at C, because this is taken care of by the former positioning of the stud 33 in bore 29 by actuation of the set screw 41.

(6) The crescent shape of the peripheral groove 35 may readily be machined into the cylindric surface of the stud 33 by eccentric cutting, thus eliminating the need for costly finishing operations at the ends of the constant-depth and like grooves. This crescent-shaped form of groove is also advantageous in minimizing weakening of the stud such as would occur by using a circular groove, or threading it. It also avoids finicking adjustments in placing the stud, as would be required were a mere hole to be used for receiving the set screw. The cost of placing a hole in the side of a cylinder is also higher for a given degree of accuracy required.

(7) The cost of the construction is low because a higher degree of accuracy is not required of any threaded construction.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Means for radially mounting a roller on a driven shaft of a roller gear drive, the roller having inner and outer cylindric races; comprising a hub on said shaft having therein a cylindric radial bore, a cylindric stud located in said bore, said stud having a recess in its cylindric surface, a set screw threaded in the hub and having a point engaging said recess, said bore having a counterbore, a spacer ring of thickness greater than the depth of said counterbore and seated therein, the inner race of said roller being supported on said ring and on an extending portion of said stud with the outer end of said inner race located beyond the outer end of said stud, a flanged bearing cap threaded into the end of the stud, the flange of which engages the outer end of said inner race clear of the end of the stud, and locking means for said cap.

2. Means for radially mounting a roller on a driven shaft of a roller gear drive, the roller having inner and outer cylindric races; comprising a hub on said shaft having therein a cylindric radial bore, a cylindric stud located in said bore, said stud having a partially peripheral groove of angular axial section, a set screw threaded in the hub and having a point engaging with said groove and having an apex angle equal thereto, said bore having a counterbore, a spacer ring of thickness greater than the depth of said counterbore and seated therein, the inner race of said roller being supported endwise on said ring and radially on an extending portion of said stud with the outer end of said inner race located only slightly beyond the outer end of said stud, a flanged bearing cap threaded into the end of the stud, the flange of which engages the outer end of said inner race clear of the end of the stud, and oppositely located locking set screws threaded through the flange and inwardly engaging the end of the stud.

3. Means for radially mounting a roller on a driven shaft of a roller gear drive, the roller having inner and outer cylindric races; comprising a hub on said shaft having therein an accurately machined cylindric radial bore, a cylindric stud located in said bore and accurately machined for a light press fit in said bore, said stud having a peripheral groove, a set screw threaded in the hub and having a point engaging with said groove and adapted upon tightening to force the stud into a final position against the friction of said fit, said bore having a counterbore of accurate depth, a spacer ring of accurate thickness greater than the depth of said counterbore, the inner race of said roller being supported with a press fit on an extending portion of said stud with the outer end of said roller slightly beyond the outer end of said stud, a flanged bearing cap threaded into the end of the stud, the flange of which engages the end of said inner race clear of the end of the stud, and locking means for said cap.

4. Means for radially mounting a roller on a driven shaft of a roller gear drive, the roller having inner and outer cylindric races; comprising a hub on said shaft having therein an accurately machined cylindric radial bore, a cylindric stud located in said bore and accurately machined for a light press fit in said bore, said stud having a peripheral crescent-shaped groove of constant angle in axial section but of variable depth, a set screw threaded in the hub and having a point engaging with said groove, said point being of an apex angle substantially equal to the constant angle of the groove, and adapted upon tightening of the set screw to force the stud into a final position against the friction of said light press fit, said bore having a counterbore of accurate depth, a spacer ring of accurate thickness greater than the depth of said counterbore, the inner race of said roller being supported with a press fit on an extending portion of said stud with the outer end of the inner race of said roller located only slightly beyond the outer end of said stud, a flanged bearing cap threaded into the end of the stud, the flange of which engages the end of said inner race clear of the end of the stud, and opposite locking set screws threaded through the flange and engaging the end of the stud.

No references cited.